United States Patent [19]

Joswig et al.

[11] Patent Number: 5,126,435
[45] Date of Patent: Jun. 30, 1992

[54] PROCESS FOR THE PREPARATION OF METALLISABLE AZO DYES

[75] Inventors: Hans P. Joswig, Grenzach-Wyhlen; Werner Huber, Schwörstadt, both of Fed. Rep. of Germany

[73] Assignee: Ciba-Geigy Corporation, Ardsley, N.Y.

[21] Appl. No.: 596,611

[22] Filed: Oct. 11, 1990

Related U.S. Application Data

[63] Continuation of Ser. No. 280,063, Dec. 5, 1988, abandoned.

[30] Foreign Application Priority Data

Dec. 7, 1987 [CH] Switzerland ............ 4758/87

[51] Int. Cl.$^5$ .................................. C076 245/10
[52] U.S. Cl. ............................ 534/582; 534/583; 534/602; 534/842
[58] Field of Search ........... 534/582, 583, 602, 842

[56] References Cited

U.S. PATENT DOCUMENTS

2,812,321 11/1957 Eberhart et al. .................. 260/141

FOREIGN PATENT DOCUMENTS

| | | | |
|---|---|---|---|
| 648364 | 1/1951 | United Kingdom | 534/583 |
| 0187621 | 7/1986 | European Pat. Off. | 534/583 |
| 195228 | 2/1908 | Fed. Rep. of Germany | 534/842 |
| 1063727 | 1/1957 | Fed. Rep. of Germany | 534/842 |
| 3808817 | 9/1988 | Fed. Rep. of Germany | 534/583 |
| 61-254550 | 11/1986 | Japan | 534/583 |

OTHER PUBLICATIONS

Rys/Zollinger, Farbstoffchemie, pp. 58,59,70 and 71 (1982).
Chem. Abstr. 108:206265x (1988).
Chem. Abstr. 108:188434v (1988).
Chem. Abstr. 108:206266y (1988).
Chem. Abstract 106:178104 (1987) Mitsui, II.
Fiery-David, Grundlegende Operationen der Farbenchem i.e., Springer-Verlag (1952).
Coloranti Azoici, Editura Technica Bucuresti (1981) 330-331.

*Primary Examiner*—Joseph Paul Brust
*Assistant Examiner*—M. S. H. Gabilan
*Attorney, Agent, or Firm*—Marla J. Mathias; Edward McC. Roberts

[57] ABSTRACT

A process for the preparation of azo dyes of formula

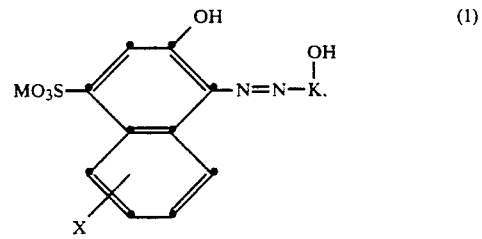

(1)

wherein K is the radical of a coupling component of the benzene or naphthalene series or of the heterocyclic series, and the hydroxy group is attached to K adjacent to the azo group, X is hydrogen or nitro and M is an alkali metal ion or an ammonium ion, which process comprises coupling a diazo component of formula

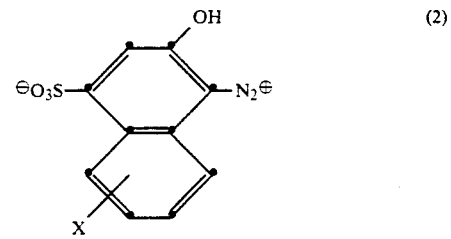

(2)

in the presence of a zinc salt and in an inert gas atmosphere, to a coupling component of formula

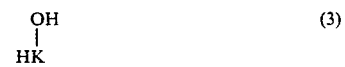

(3)

in which formula (2) and (3) above K and X are as defined for formula (1).

The process makes it possible to obtain the azo dyes in high yield.

15 Claims, No Drawings

PROCESS FOR THE PREPARATION OF METALLISABLE AZO DYES

This application is a continuation of application Ser. No. 280,063, filed Dec. 5, 1988, now abandoned.

The coupling of 1-diazo-2-hydroxynaphthalene-4-sulfonic acid, or of the corresponding component containing a nitro group, to a coupling component of the benzene, naphthalene or pyrazolone series which contains a hydroxy group adjacent to the coupling site, proceeds in some cases slowly and in unsatisfactory yield.

In recent years, increasing efforts have been made to automate and optimise processes for the preparation of dyes or their intermediates, both as regards the synthesis and the working up. To obtain satisfactory results, the dye manufacturer is dependent on processes to which the following criteria apply: as quantitative a yield as possible, reproducibly good quality, reactions with as few working up steps as possible, and fast reactions that permit a high number of reactions per unit of time.

It has now been found that these objectives can be achieved by means of the process of this invention.

The process of this invention for the preparation of azo dyes of formula

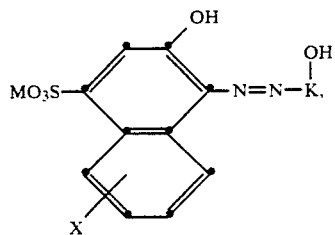

wherein K is the radical of a coupling component of the benzene or naphthalene series or of the heterocyclic series, and the hydroxy group is attached to K adjacent to the azo group, X is hydrogen or nitro and M is an alkali metal ion or an ammonium ion, comprises coupling a diazo component of formula

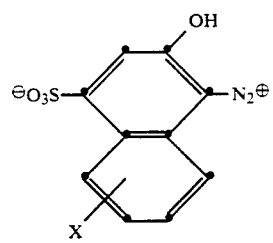

in the presence of a zinc salt and in an inert gas atmosphere, to a coupling component of formula

in which formulae (2) and (3) above K and X are as defined for formula (1).

Coupling compounds of formula (2) to compounds of formula (3) is known to be difficult. Attempts have therefore been made to improve the yield by using different catalysts, for example in the presence of calcium or magnesium salts, or by coupling under nitrogen. Calcium and magnesium salts improve the yield, but a drawback is the usually difficult removal of the salt content after completion of the reaction.

It is surprising that the process of this invention affords a marked increase in yield by carrying out the coupling in the presence of a zinc salt and in an inert gas atmosphere, and that the reaction is almost fully complete even after a very short time.

The zinc salt conveniently used in the process of this invention is a zinc halide. In a preferred embodiment of the process, zinc chloride is used.

The amount in which the zinc salt is used in the process of this invention can vary within wide limits. In general, it has proved convenient to use the 0.2-fold to 1-fold molar amount of zinc salt, preferably zinc chloride, based on the molar amount of the diazo component of formula (2).

A preferred embodiment of the process of the invention comprises using the 0.45- to 0.65-fold molar amount of zinc salt, preferably zinc chloride.

A further preferred embodiment of the process of this invention comprises carrying out the coupling in the temperature range from 27° to 40° C., more particularly from 30° to 35° C. and, most preferably, from 32° to 34° C.

Nitrogen is preferably used as inert gas in the process of this invention.

The coupling of the compound of formula (2) to the compound of formula (3) is carried out in aqueous solution. The pH for the coupling is conveniently in the range from 10 to 12 and is preferably about 11. The acidic diazo component of formula (2) is expediently adjusted intially to a pH of ca. 6.5 with an alkali metal hydroxide before the coupling.

An especially preferred embodiment of the process of the invention comprises adding zinc chloride, preferably the 0.5- to 0.6-fold molar amount, based on the compound of formula (2), to the compound of formula (2), adjusting the pH to a value between 6.5 and 7 immediately before coupling, and then running in as rapidly as possible, at an initial temperature of ca. 30° C. and under nitrogen, a solution of the coupling component of formula (3) which has been adjusted with alkali to a pH in the range from 9 to 13.

The molar ratio of the diazo component of formula (2) to the coupling component of formula (3) is 0.8:1.2 to 1.0:1.2, preferably 0.95:1.15 to 1.00:1.15.

A further preferred embodiment of the process of the invention comprises carrying out the coupling adiabatically, an initial temperature of at least 30° C. being especially advantageous.

When the coupling is complete, the azo dye of formula (1) can be further processed, for example by metallising to a metal complex dye, after purification, for example salting out. To isolate the dye of formula (1), it is convenient to heat the coupling mixture briefly, for example to a temperature in the range from 60° to 90° C., whereby a readily filterable form of the coupling product is obtained.

After the coupling, the zinc salt can be precipitated almost completely in the form of zinc carbonate, so that the wastewater is not polluted.

The diazo components of formula (2) which can be used in the process of this invention are preferably 1-diazo-2-hydroxynaphthalene-4-sulfonic acid and 1-diazo-6-nitro-2-hydroxynaphthalene-4-sulfonic acid. The diazo components of formula (2) are known and are prepared by known methods.

The coupling components of formula (3) are known and are prepared by known methods. The coupling components used in the process of this invention are preferably those of the benzene or naphthalene series, or of the 5-pyrazolone, hydroxyquinoline, acetoacetarylide or benzoylacetic acid series.

Aside from the hydroxy group, the coupling components of formula (3) can also be substituted by the following substituents: $C_1$–$C_6$alkyl, $C_1$–$C_6$-alkoxy, $C_2$–$C_6$alkanoylamino, $C_1$–$C_6$alkoxycarbonylamino, halogen, sulfo, sulfonamide and sulfone groups.

$C_2$–$C_6$Alkanoylamino may suitably be acetylamino, propionylamino or butyrylamino.

$C_1$–$C_6$Alkoxycarbonylamino may suitably be methoxycarbonylamino or ethoxycarbonylamino.

$C_1$–$C_6$Alkyl is typically methyl, ethyl, propyl, isopropyl, butyl, secbutyl, tert-butyl, isobutyl, pentyl or hexyl.

$C_1$–$C_6$Alkoxy is typically methoxy, ethoxy, propoxy, isopropoxy or butoxy.

Halogen is suitably fluoro, bromo or, preferably, chloro.

Sulfonamido is, for example, —$SO_2NH_2$, $SO_2NH$—$C_1$–$C_6$alkyl, for example —$SO_2NHCH_3$, or —$SO_2NHC_2H_5$ and —$SO_2N(C_1$–$C_6$alkyl$)_2$, for example —$SO_2N(CH_3)_2$ and $SO_2N(C_2H_5)_2$ as well as

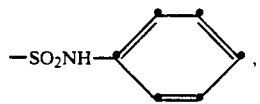

in which the phenyl nucleus can be substituted, for example by sulfo or carboxy.

Sulfone groups are, for example, —$SO_2$—$C_1$–$C_6$alkyl such as —$SO_2$—$CH_3$ and —$SO_2$—aryl such as phenylsulfonyl.

A particularly preferred embodiment of the process of this invention comprises the use of a coupling component of formula (3), wherein K is a radical of the benzene or naphthalene series or is a 1-phenyl-3-methylpyrazol-5-one radical, which radicals may carry one to three of the above substituents. K is preferably the naphthyl radical.

Particularly suitable coupling components are phenols which are substituted by $C_1$–$C_6$alkyl and/or $C_1$–$C_6$alkanoylamino or $C_1$–$C_6$alkoxycarbonylamino, and in particular, naphthols which are unsubstituted or substituted by chloro, $C_2$–$C_6$alkanoylamino, $C_1$–$C_6$alkoxycarbonylamino, sulfo, sulfonamide or sulfone groups, for example 4-methylphenol, 4-tert-butylphenol, 2,4-dimethylphenol, 2-acetylamino-4-methylphenol, 1- or 2-naphthol, 1-naphthol-3-, -4- or -5-sulfonic acid, 2-naphthol-3-, -4-, -5-, -6-, -7- or -8-sulfonic acid, 2-naphthol-6-sulfamide, 1-acetylamino-7-naphthol, 1-acetylamino-6-naphthol, 1-propionylamino-7-naphthol and 1-carbomethoxyamino-7-naphthol.

A particularly interesting embodiment of the process of the invention comprises the use of 1-diazo-2-hydroxynaphthalene-4-sulfonic acid as diazo component of formula (2).

A further particularly interesting embodiment of the process of the invention comprises the use of β-naphthol as coupling component of formula (3).

The azo dyes obtained by the process of this invention are suitable for the preparation of metal complex dyes, for example chromium or cobalt complex azo dyes, wherein metallising is carried out by methods which are known per se.

In the following Examples, parts are by weight. The relationship between parts by weight and parts by volume is the same as that between the gram and the cubic centimeter.

EXAMPLE 1

137.5 parts of 1-diazo-2-hydroxynaphthalene 4-sulfonic acid are added to 700 parts of water and the pH is adjusted to 2.5-3 by addition of 22 parts of sodium hydroxide. Then 100 parts of ice are added, followed by the addition of a solution of 2.2 parts of the sodium salt of tetralinesulfonic acid in 25 parts of water of 50° C. The mixture is stirred for 5 minutes and then 82 parts of a 50% solution of zinc chloride in water are run in. The pH of the viscous yellow suspension is adjusted to 6.4–6.6 with ca. 2.5 parts of sodium hydroxide and the reactor is blanketed with nitrogen. A warm solution of 30° C. containing 250 parts of water, 30 parts of sodium hydroxide and 92.5 parts of β-naphthol is run into the suspension of the diazo component under nitrogen and over a period of ca. 30 minutes. The temperature rises to ca. 30° C. When this addition is complete, the pH is adjusted to 11 with ca. 15 parts of sodium hydroxide under nitrogen. The reaction mixture is stirred at a temperature of ca. 32° C. and a pH of ca. 11 for 2 hours under nitrogen until the coupling is complete. Afterwards no further nitrogen blanketing is necessary. The pH is adjusted to 1.5–2 by addition of ca. 100 parts of a 38% solution of hydrochloric acid, and the reddish brown suspension of the monoazo dye is filtered. The yield is ca. 99% of theory, based on diazo component.

The use of an equimolar amount of 1-diazo-6-nitro-2-hydroxynaphthalene-4-sulfonic acid instead of 1-diazo-2-hydroxynaphthalene-4-sulfonic acid gives a dye in similarly high yield after a comparably short residence time in the coupling reactor.

EXAMPLES 2–4

The procedure described in Example 1 is repeated, replacing 82 parts of a 50% solution of zinc chloride by the amounts indicated in the Table 1 below. The same dye is obtained in comparably good yield.

TABLE 1

| Examples | Parts of a 50% solution of zinc chloride |
|---|---|
| 2 | 70 parts |
| 3 | 100 parts |
| 4 | 140 parts |

What is claimed is:

1. A process for the preparation of an azo dye of formula

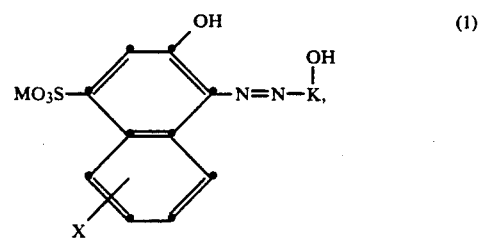

wherein K is the radical of a coupling component of the benzene or naphthalene series or of the heterocyclic series, and the hydroxy group is attached to K adjacent to the azo group, X is hydrogen or nitro and M is an alkali metal ion or an ammonium ion, which process comprises coupling a diazo component of formula

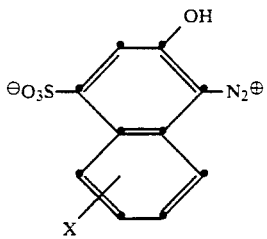 (2)

in the presence of a zinc salt and in the substantial absence of surface active agents in an inert gas atmosphere, and at a temperature from 30° to 35° C. to a coupling component of formula

 (3)

$$\begin{array}{c} \text{OH} \\ | \\ \text{HK} \end{array}$$

in which formulae (2) and (3) above K and X are as defined for formula (1).

2. A process according to claim 1, wherein the coupling is carried out in the presence of a zinc halide.

3. A process according to claim 2, wherein the coupling is carried out in the presence of zinc chloride.

4. A process according to claim 1, wherein the coupling is carried out under nitrogen.

5. A process according to claim 1, wherein the coupling is carried out in the presence of the 0.2- to 1-fold molar amount of a zinc halide, based on the molar amount of the diazo component of formula (2).

6. A process according to claim 5, wherein the coupling is carried out in the presence of the 0.45- to 0.65-fold molar amount of a zinc halide, based on the molar amount of the diazo component of formula (2).

7. A process according to claim 5, wherein the coupling is carried out in the presence of the 0.45- to 0.65-fold molar amount of zinc chloride, based on the molar amount of the diazo component of formula (2).

8. A process according to claim 1, wherein coupling is carried out at a pH in the range from 10 to 12.

9. A process according to claim 1, wherein the coupling is carried out adiabatically.

10. A process according to claim 1, which comprises the use of a coupling component of formula (3), wherein K is the radical of a coupling component of the benzene or napthalene series or the 5-pyrazolone, hydroxyquinoline, acetoacetarylide or benzoylacetic acid series.

11. A process according to claim 10, wherein K is a radical of the benzene or naphthalene series or is a 5-pyrazolone radical, which radicals may be substituted by $C_1$-$C_6$alkyl, $C_1$-$C_6$alkoxy, $C_2$-$C_6$alkanoylamino, $C_1$-$C_6$alkoxycarbonylamino, halogen, sulfo, sulfonamide and sulfone groups.

12. A process according to claim 1, which comprises the use of a coupling component of formula (3), wherein K is the naphthyl radical.

13. A process according to claim 1, wherein the coupling component is $\beta$-naphthol.

14. A process according to claim 1, wherein the diazo component of formula (2) is 1-diazo-2-hydroxynaphthalene-4-sulfonic acid.

15. A process according to claim 1 wherein coupling is carried out in the temperature range from 32° to 34° C. and in the pH range from 10 to 12.

* * * * *